(12) United States Patent
Gabriel et al.

(10) Patent No.: US 8,315,892 B2
(45) Date of Patent: Nov. 20, 2012

(54) ASSIGNMENTS OF PLACES

(75) Inventors: Hugues Gabriel, Bar sur Loup (FR); Sophie Rabbe, Mougins (FR)

(73) Assignee: Amadeus S.A.S., Sophia Antipolis (FR)

( * ) Notice: Subject to any disclaimer, the term of this patent is extended or adjusted under 35 U.S.C. 154(b) by 939 days.

(21) Appl. No.: 12/157,858

(22) Filed: Jun. 12, 2008

(65) Prior Publication Data
US 2009/0287629 A1 Nov. 19, 2009

(30) Foreign Application Priority Data
May 15, 2008 (EP) .................................... 08305171

(51) Int. Cl.
*G06Q 10/00* (2012.01)
(52) U.S. Cl. .......................................................... 705/5
(58) Field of Classification Search ........................ 705/5
See application file for complete search history.

(56) References Cited

U.S. PATENT DOCUMENTS

| | | | | |
|---|---|---|---|---|
| 5,404,291 A * | 4/1995 | Kerr et al. ........................ | 705/5 |
| 2003/0050865 A1 * | 3/2003 | Dutta et al. ..................... | 705/27 |
| 2003/0225593 A1 | 12/2003 | Ternoey et al. | |
| 2004/0117528 A1 | 6/2004 | Beacher et al. | |
| 2004/0267567 A1 | 12/2004 | Barrera et al. | |
| 2005/0154620 A1 * | 7/2005 | Hentschel et al. .............. | 705/5 |
| 2006/0149586 A1 * | 7/2006 | Brown ............................ | 705/1 |
| 2006/0287810 A1 * | 12/2006 | Sadri et al. .................... | 701/200 |
| 2007/0208635 A1 * | 9/2007 | Van Luchene et al. ......... | 705/26 |
| 2008/0281644 A1 * | 11/2008 | Payne ............................. | 705/5 |

FOREIGN PATENT DOCUMENTS
WO    WO 93/03444    2/1993

OTHER PUBLICATIONS

Deady, Tim, "Hotels Key on Meeting Facilities Amid Tourism Slump," Los Angeles Business Journal, Los Angeles, CA, Feb. 15, 1993, p. 21.*

* cited by examiner

*Primary Examiner* — Nathan Erb
(74) *Attorney, Agent, or Firm* — Wood, Herron & Evans, LLP

(57) ABSTRACT

A method of assigning a place to a customer, including the steps of: determining a set of business rules associated with the provision of the place to the customer; determining a set of available places, the or each of the set of available places having one or more attributes; determining one or more customer preferences in respect of the one or more attributes; applying the business rules to define a set of allowed combinations of place and customer; determining a score in relation to the set of allowed combinations of place and customer; selecting the highest scoring allowed combination from the set of allowed combination of place and customer; and assigning the place to the customer based on the highest scoring allowed combination.

8 Claims, 3 Drawing Sheets

| Priority | Customer Type | Percentage | Room Attribute | Floor |
|---|---|---|---|---|
| 1 | Customer value: 0-100 | 5% | Sea view | 2,3 |
|  |  | 5% | Garden view | 1 |
| 2 | Customer value: 100-200 | 10% | Garden view | 2,3 |
| 3 | Company: Amadeus | 5% | Sea view | 1 |

FIG. 2

| Customer Type | Association | Association type | Attributes |
|---|---|---|---|
| Customer type: disabled | Match | Mandatory | Room: Disabled |
| Customer value: 0-100 | Match | Preferred | Room: Sea view |
| Customer type: tall | Do not Match | Preferred | Room: Small bed |
| Customer type: smoking | Match | Mandatory | Room: Smoking |
| Customer type: group of young people | Do not sleep next to | Preferred | Customer type: business |

FIG. 3

| Rule Type | Priority |
|---|---|
| Customer preferences | 2 |
| Multiple rooms | 4 |
| Protection rule | 3 |
| Suitability rule | 1 |

ASSIGNMENTS OF PLACES

FIELD OF THE INVENTION

The present invention relates to a method and apparatus for improving the assignment of places, particularly but not exclusively in the travel industry for the assignment of hotel rooms, seats, vehicles etc.

BACKGROUND OF THE INVENTION

In the travel industry, operators use property management systems (PMS) to assign places, such as rooms in an hotel. The property management systems usually assign rooms manually, based on room planning criteria.

WO93/303444 (Hyatt Corporation) discloses a reservation system for a hotel having a matrix system which identifies room type, the category of rooms and combinations of both of these attributes. This system provides information of the maximum number of rooms available, the numbers of rooms already occupied, the numbers of rooms currently available etc.

Occasionally, property management systems have been known to work automatically, operating with very basic allocation processes in which the first available room is allocated to a customer. Within this automated environment a number of algorithms exist which consider the "customer value" and room attributes. The principles of the algorithm are as follows:—

- A hotelier can give a weighting to each existing room attributes (for example, a sea view may have a weighting of +2, whilst a parking view may be −1; a shower may have a weighting of 0 and a bath of +1; etc.).
- An overall value can be calculated from the sum of the various attributes.
- The "customer value" for each customer is determined based on visit frequency and spending for example.
- The process then determines rooms which match customer preferences and if several rooms form that match the process associates one room with the customer. If no rooms match, the process tries to shuffle the customers to find a combination that might work.

A number of problems exist with these types of processes. For example, a hotel may allocate all its rooms to low value customers who were booked earlier than high-value customers that may book later. Similarly, many customer characteristics that may be available to the hotelier are not used in the consideration of room allocation or the allocation of other places.

SUMMARY OF THE INVENTION

An object of the present invention is to alleviate at least some of the problems associated with the prior art systems.

A further object of the present invention is to provide a method and apparatus for allocation of places which take into account customer characteristics and operator requirements.

According to one aspect of the present invention there is provided a method of assigning a place to a customer, the method comprising the steps of: determining a set of business rules associated with the provision of the place to the customer; determining a set of available places, the or each of the set of available places having one or more attributes; determining one or more customer preferences in respect of the one or more attributes; applying the business rules to define a set of allowed combinations of place and customer; determining a score in relation to the set of allowed combinations of place and customer; selecting the highest scoring allowed combination from the set of allowed combination of place and customer; and assigning the place to the customer based on the highest scoring allowed combination.

According to a second aspect of the present invention there is provided a system for assigning a place to a customer, the system comprising: a business rules module for determining a set of business rules associated with the provision of the place to the customer; the place availability module for determining a set of available places, the or each of the set of available places having one or more attributes; a customer profile module for determining one or more customer preferences in respect of the one or more attributes; a processing module for applying the business rules to define a set of allowed combinations of place and customer, determining a score in relation to the set of allowed combinations of place and customer and selecting the highest scoring allowed combination from the set of allowed combination of place and customer; and an allocation module for assigning the place to the customer based on the highest scoring allowed combination.

There are many advantages provided by the present invention. For example, using a combination of customer preferences and business rules enables an hotelier to allocate rooms in a most efficient manner. In addition, rooms can be set aside for high-value customers who may book later than lower value customers. Different customer preferences and business rules can be used for different environments and different users; making the method and system highly adaptable to many different circumstances.

BRIEF DESCRIPTION OF THE DRAWINGS

Reference will now be made, by way of example, to the accompanying drawings, in which:

FIG. 2 is a first table for demonstrating room attributes in accordance with one embodiment of the present invention, by way of example.

FIG. 3 is a second table from demonstrating associations in accordance with one embodiment of the present invention, by way of example.

DETAILED DESCRIPTION OF THE EMBODIMENTS

Figure 1:
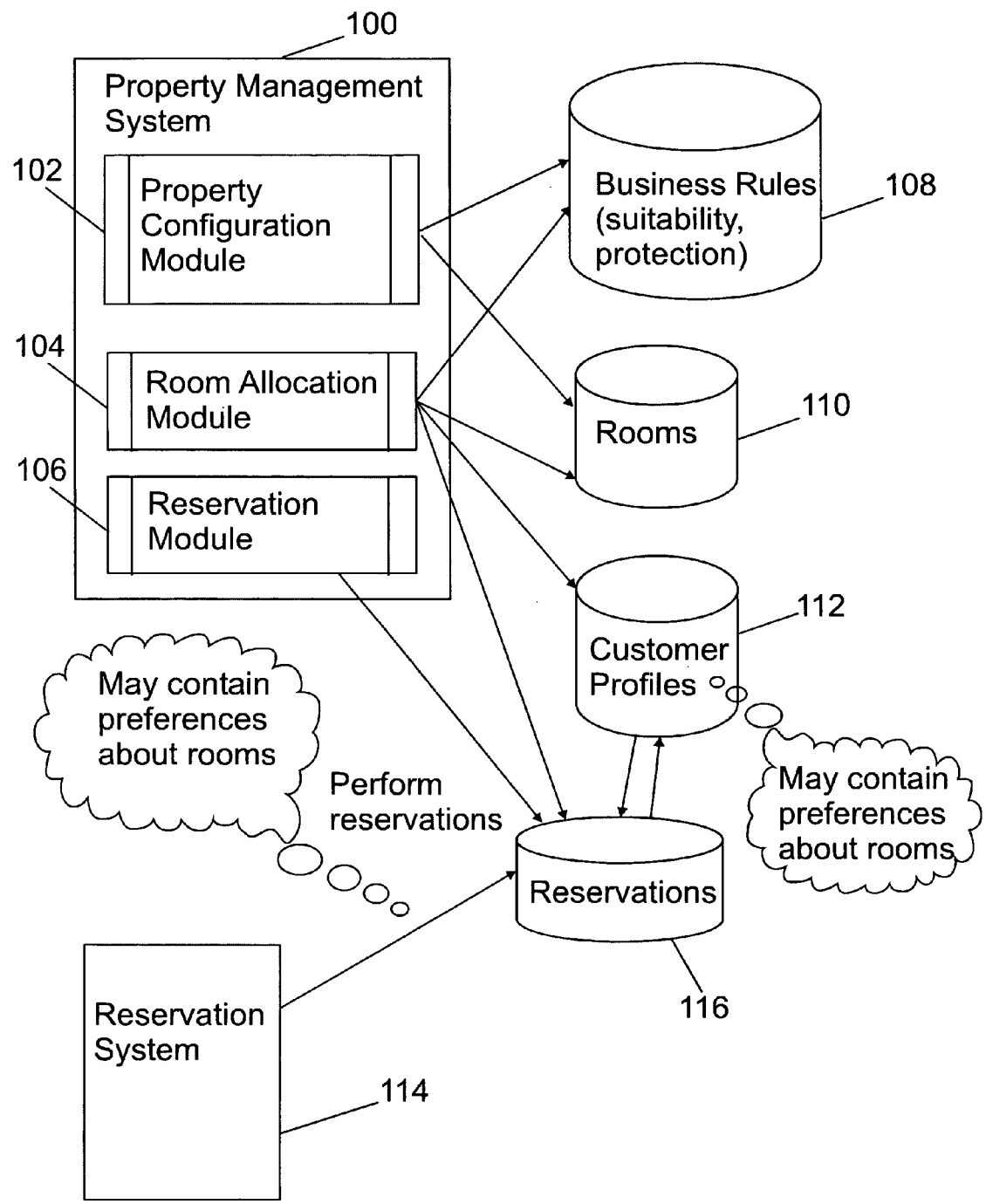
FIG. 1 is a block diagram of a property management system in accordance with one embodiment of the invention, by way of example.

In general terms this invention relates to a place assignment process based on a set of business rules that are defined at least partially by the supplier of the places. In another aspect, the invention relates to a computer-based system for assigning a place to a customer. The system comprises an identification module for receiving customer requests and identifying from those requests a group of customers requesting a joint booking and a selection module for selecting a predetermined customer from the group in respect of a specific value related to a previous generated revenue by the predetermined customer. A business rules rule module retrieves from a business rule database a set of business rules associated with the provision of the place to the customer, and a place availability module retrieves from an available places database a set of available places, the or each of the set of available places having one or more attributes. A customer profile module retrieves from a customer preferences database one or more customer preferences in respect of the one or more attributes. An allocation rule logic module assigns a priority order to the business rules and applies the business rules in accordance with the priority associated with a specific assignment of places. A processing module applies the business rules to the customer preferences to created create a set of allowed combinations of place and customer for each customer in the group; determines from the retrieved set of available places and retrieved customer preferences a global score in relation to the set of allowed combinations of place and customer for each customer of the group; determines a score in relation to the degree of proximity between each place and the predetermined place of the predetermined customer; updates the global score to include the score in relation to the degree of proximity to produce updated scoring pertaining to allowed combinations of place and customer; and selects the highest scoring allowed combination from the set of allowed combination of place and customer. An allocation module assigns the place to the customer based on the highest scoring allowed combination. Each module may be software enabled or may be a physical device. In the example presented below the place is a room in a hotel, although it will be appreciated that other places may be assigned by means of this invention. For example, hire cars, airplane and trains seats, apartments for holidays, cabins in ships etc. The business rules provide recommendations and priorities for assigning customers to physical rooms based on both the customer characteristics and the room attributes. The following rules provide an example of rules that can be applied to allocate customers to rooms:— a set of rules defined by the hotelier.

protection rules to protect some rooms for certain preferred customers; and suitability rules to allocate rooms depending on customer characteristics.

certain predefined rules used in the allocation process that are not generally defined by users:

customer preferences that are matched with the room attributes; and linkage rules which are used allocate adjacent rooms where multiple room reservations are made.

Different priorities can be given to the business rules in respect of the allocation process (for example more importance can be given to the protection rule than the suitability rule). This provides a high degree of flexibility in the manner in which the present invention can allocate places.

The customer data that can be considered for place or room allocation could be based on one more of the following types:— customer characteristics (for example adult, child, smoker, non-smoker, disabled person, blind person, deaf person, etc);

customer value characteristics which take into account the revenue generated by the customer either in the hotel or the hotel chain in the past (this could be based on a loyalty program);

customer preferences for particular room attributes (for example preferred view, preferred floor, preferred room type, etc.);

information relating to the employer of a customer in the case of business customers.

This information could be accessed from a customer profile or from a reservation request. The rate at which the room is sold can also be considered as a room attribute with the highest attribution being given to the rooms with the highest room rates. Many other preferences and attributes will be evident on reading the further details of the present invention and will be evident to the person skilled in the art.

Referring now to FIG. 1 the system overview of the property management system will now be described. The property management system 100 includes a property configuration module 102, an allocation module 104 and a reservation module 106. The system also includes a business rules database 108, which stores rules such as suitability and protection. The business rules database may be set up by the hotelier using the property configuration module of the PMS. This can provide recommendations which take into account both customer characteristics and room preferences (if any) and the physical set of rooms in the hotel. This could be used to set aside a floor of rooms in the event of maintenance work within the hotel for example. A database of available rooms 110 is also included. The rooms database contains the room attributes, for example view, capacity, type of bed, floor etc. The database of customer profiles 112 holds the customer profiles and may contain preferences about preferred rooms for each customer. In addition, the customer profile databases may contain information relating to value, physical characteristics, history of reservations and comments, room preferences etc. of the customer. A reservation system 114 interacts with the reservations database 116 to enable the reservation process to be carried out. The reservation database holds any reservation made by the PMS or any other external reservation systems (114). Each reservation can have an associated customer profile which may indicate particular preferences in relation to the room attributes for that customer for that reservation.

The property configuration module 102 takes information from the business rules database 108 and the available rooms database 110. The room allocation module interacts with the databases relating to business rules 108, rooms allocation 110, customer profiles 112 and reservations 116. The reservation module 106 interacts directly with the reservations database 116 and in turn the reservation system 114. The request from the reservation system may contain room preferences for the customers.

Details of the various business rules according to the present invention will now be described. The first type of business rules are referred to as user-defined rules. The first of these user-defined rules is referred to as a protection rule. The protection rule enables a user (for example an hotelier) to set aside certain rooms for high-value customers based on the room attributes, floor level etc. For example, a certain percentage of sea view rooms and a certain percentage of ground-floor garden rooms can be set aside for high-value customers in a particular hotel. In effect the business rules serve to identify rooms that can and cannot be assigned in the subsequent processes. In addition, the business rules allow assignment in some but not all combinations of room and customer. In other words there are room and customer combinations which are allowed and those which are not by the business rules. Further a priority may be applied to each rule, which can additionally assist in the determination of allowed combinations of room and customer. The room allocation process tries to find a room which matches a target priority value from the allowed combination of room and customer.

FIG. 2 shows a table illustrating priority, customer type, given percentage, room attributes and floor. High-ranking customers with the customer value in the range of 0 to 100 may be allocated within the 5% of second and third floor sea view rooms and within 5% of first floor garden rooms. Similarly customers with a customer value in the range of 100 to 200 may be allocated within the 10% of second and third floor garden view rooms as illustrated. Finally business customers from a particular company (for example Amadeus) may be allocated the 5% of first floor sea view rooms as shown in the table. This enables an hotelier to protect and set aside rooms for high-value customers, since the high priority rules do not allow allocation of these priority rooms to customers below a certain customer value. If, later, there are no high value customers requiring these particular rooms, the rooms may be allocated to someone else at a later date.

A second user-defined rule is referred to as the suitability rule. This rule is used to enable a description of preferences for allocating rooms based on customer characteristics and room attributes. Association between the customer preferences and the room attributes can be indicated by a number of different types including, for example, match, do not match, sleep next to, do not sleep next to etc. Each association can be either mandatory or preferred, depending on the particular circumstances of a particular request for a place. If the association is mandatory then the association has to be satisfied, whereas if it is preferred it must be satisfied if possible.

FIG. 3 shows an example of the table indicating customer type, association, association type and attributes. It can be seen from the table that when customer type indicates that the customer is disabled it is mandatory to match this customer with a room having facilities suitable for a disabled person. Similarly, if the customer type referred to is a tall customer the association "do not match" is preferred with respect to a room having a small bed. Other examples are shown in the table, although it will be appreciated there are many other examples that can be managed in this way by this type of table, which forms part of the allocation algorithm.

Another type of business rule is referred to as a set of default rules. Under these default rules, the allocation process would try to ensure that customer preferences taken from their profile, or from the reservation request, are matched as well as possible with the room attributes and facilities. In addition, where groups of customers have joint bookings, where possible the customers should be allocated adjacent rooms or rooms in the same area. It will be appreciated that many other default rules can exist and be applied to the allocation process.

Figures 4, 5:
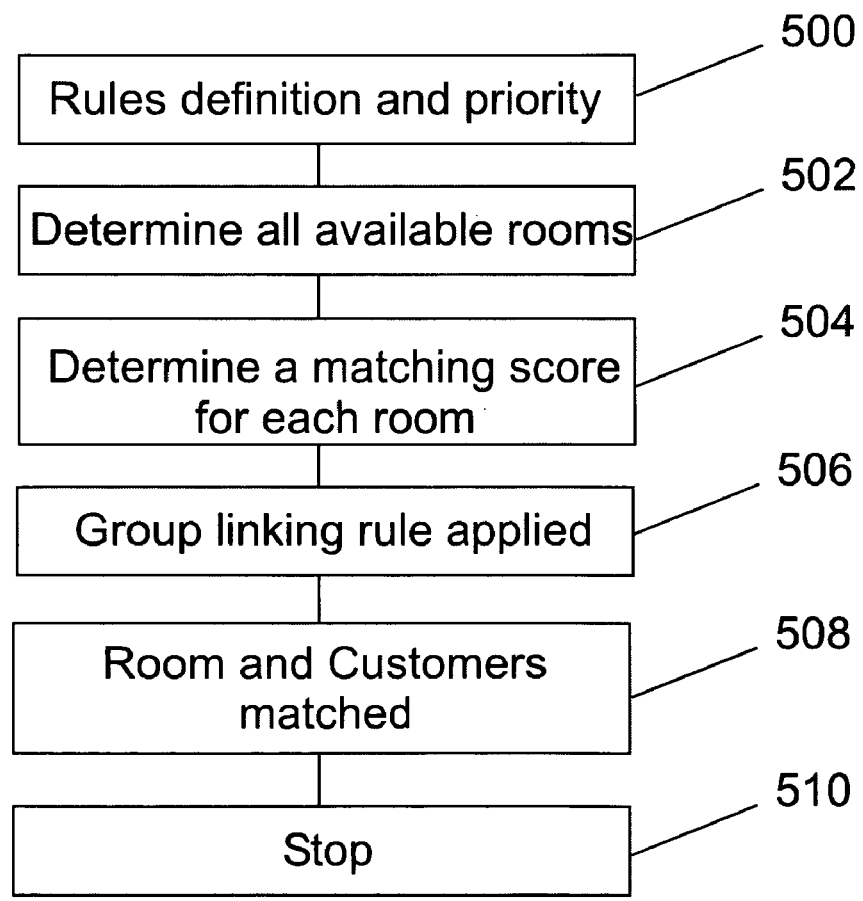
FIG. 4 is a third table for demonstrating priority in accordance with one embodiment of the present invention, by way of example.
FIG. 5 is a flow chart of the methods steps in accordance with one embodiment of the present invention, by way of example.

Allocation rule logic may be defined by the hotelier or users to determine the priority under which the associations are made. In other words, to ensure that the allocation algorithm considers the rules in a predefined order based on hotelier and/or user preferences. FIG. 4 shows an example of the table indicating rule type and priority for that rule type. From this it can be seen that suitability is the most important rule, while multiple room requirements is the least important rule. When the customer is being allocated a specific room, whether this is at the pre-allocation process or at check-in time, the different rules will be taken into account in the given priority order. For different allocations and assignment of places different priorities may apply.

Referring now to FIG. 5 the principal steps of the assignment process will now be described. At step 500 the business rules (as identified above) to apply to the allocation and assignment process are defined and the priority of each with respect to the other is determined. At step 502 a determination is made to identify all available rooms. The rooms are discarded if they are already occupied or are restricted by particular business rules. For example, a room may be restricted due to maintenance on a particular floor, or be set aside for high value customers, where the current customer is not a high value customer. The business rules may relate to a mandatory non-matching rule for a suitability rule or the fact that rooms are protected for higher value customers by a protection rule etc. Other business rules may equally well apply at this step.

At step 504, a "matching" score for each room is determined. This is achieved by giving a score to each room (for example a percentage satisfaction with a criteria or preference) for each rule, with the exception of the linking rules. For example, for the protection rule if the room matches the characteristics a score of 100 may be given; if only certain room characteristics match, a score of only 50 may be given; otherwise a score of 0 may be given. Similarly, for the suitability rule a score may be given which is proportional to the number of matching rules. For example, a score of 100 is given if all rules match, 50 if only half of the rules match and 0 if none of the rules match. Customer preferences may be scored in a manner that is proportional to the number of matching preferences. Finally a global score is calculated for a room based on a percentage of satisfaction of each set of rules considered for the combination of room and customer. It will be appreciated that each of the scores and the final score will be based on different characteristics and criteria dependent on the place to be allocated, the business rules and customer preferences utilized, and any other appropriate method of determining suitability.

Optionally at step 506 a group linking rule may be applied. This is used in the case of groups of customers requesting several rooms together. In this situation step 504 is carried out for each customer in the group, with the custom of the highest value in the group being considered first. The processing step 504 is completed for each guest in the group and a score is given depending on the degree of proximity of each of the rooms. For example a score of 100 may be given for an adjacent room, a score of 75 may be given for a room on the same floor and a score of zero may be given for a room on any other floor. If the group linking rule is applied the final global score is re-computed based on the group linking rule and a new final global score is determined for each room.

Finally in step 508 the room and customer are matched by selecting the room with the highest global score for all the rooms considered for that customer. In this way the room with the highest possible score is assigned to the customer. At step 510 the process stops.

It will be appreciated that various combinations of methods steps, in combination or alone, may be carried out for different elements of the overall process. The various combinations are not limited to those described above; instead they may include any other combination. For example, the invention may be used to allocate or assign places in different environments, such as theatre seats, hire cars, airplane seats, apartments, other accommodation etc. It will be appreciated that in each different environment the characteristics, criteria and rules analyzed will be different.

It will be appreciated that this invention may be varied in many different ways and still remain within the intended scope and spirit of the invention.

Furthermore, a person skilled in the art will understand that some or all of the functional entities as well as the processes themselves may be embodied in software, or one or more software-enabled modules and/or devices.

The invention claimed is:

1. A computer-implemented method of assigning hotel rooms to a group of customers, the method comprising:
    receiving at a reservation system a customer request;
    identifying in response to the customer request a group of customers requesting from the reservation system a joint booking;

selecting a predetermined customer from the group in respect of a specific value related to a previous generated revenue by the predetermined customer;
retrieving from a first database a set of business rules associated with the provision of the place to each customer of the group beginning with the predetermined customer;
retrieving from a second database a set of available hotel rooms, each of available hotel rooms having one or more attributes;
retrieving from a third database one or more customer preferences in respect of the one or more attributes;
assigning a priority order to the business rules and applying the business rules in accordance with the priority associated with a specific assignment of hotel rooms;
applying the business rules to the customer preferences to create a set of allowed combinations of hotel room and customer for each customer of the group;
determining by a computer system from the retrieved set of available hotel rooms and retrieved customer preferences a first score in relation to the set of allowed combinations of hotel rooms and customer for each customer of the group;
determining a second score in relation to the degree of proximity between each available hotel room and a predetermined hotel room of a predetermined customer of the group of customers;
updating the first score to include the second score in relation to the degree of proximity to produce updated scoring pertaining to allowed combinations of hotel room and customer;
selecting the highest scoring allowed combination from the set of allowed combinations of hotel room and customer; and
assigning the hotel rooms to the customers based on the highest scoring allowed combination for each customer in the group to ensure each customer is in proximity to others in the group.

2. The method of claim 1, further comprising:
applying a business rule which protects certain hotel rooms from allocation based on the one or more attributes.

3. The method of claim 1, further comprising:
applying a business rule which identifies a suitable hotel room for allocation based on the one or more attributes.

4. The method of claim 1, further comprising:
matching the one or more attributes with one or more customer preferences to determine the score.

5. The method of claim 1, further comprising:
defining the set of business rules in accordance with operator requirement.

6. The method of claim 5, further comprising:
declining this set of business rules in accordance with a hotel operator requirement.

7. The method of claim 1, further comprising:
allocating the hotel rooms to customers based on the highest scoring allowed combination of hotel room and customer.

8. A system comprising:
a processor; and
a plurality of modules configured to be executed by the processor to assign a hotel room to a customer, the plurality of modules including:
an identification module operatively associated with a business rule database for receiving customer requests and pursuant to rules stored in the business rule database identifying from said requests a group of customers requesting a joint booking;
a selection module operatively associated with a customer profile database for selecting a predetermined customer from the group based on a customer profile in respect of a specific value related to a previous generated revenue by the predetermined customer;
a business rule module for retrieving from a the business rule database a set of business rules associated with the provision of the hotel room to the customer;
a place availability module for retrieving from an available places database a set of available hotel rooms, each of available hotel rooms having one or more attributes;
a customer profile module for retrieving from the customer profile database one or more customer preferences in respect of the one or more attributes;
an allocation rule logic module for assigning a priority order to the business rules and applying the business rules in accordance with the priority associated with a specific assignment of hotel rooms; and
a processing module for: applying the business rules to the customer preferences to create a set of allowed combinations of hotel room and customer for each customer in the group, determining from the retrieved set of available hotel rooms and retrieved customer preferences a first score in relation to the set of allowed combinations of hotel room and customer for each customer of the group, determining a second score in relation to the degree of proximity between each hotel room and the predetermined hotel room of the predetermined customer, updating the first score to include the second score in relation to the degree of proximity to produce updated scoring pertaining to allowed combinations of hotel room and customer, and selecting the highest scoring allowed combination from the set of allowed combinations of hotel room and customer; and
an allocation module for assigning the hotel rooms to the customers based on the highest scoring allowed combination for each customer in the group to ensure each customer is in proximity to others in the group.

* * * * *

UNITED STATES PATENT AND TRADEMARK OFFICE
CERTIFICATE OF CORRECTION

| | | |
|---|---|---|
| PATENT NO. | : 8,315,892 B2 | Page 1 of 1 |
| APPLICATION NO. | : 12/157858 | |
| DATED | : November 20, 2012 | |
| INVENTOR(S) | : Hugues Gabriel | |

It is certified that error appears in the above-identified patent and that said Letters Patent is hereby corrected as shown below:

In the Specification:

At column 1, line number 31, change "attributes" to --attribute--.

At column 2, line number 24, change "an" to --a-- and at line number 42, after "table", delete "from".

At column 3, line number 44, after "used", insert --to-- and at line number 52, after "one", insert --or--.

At column 4, line number 47, change "an" to --a--.

At column 5, line number 6, change "an" to --a--.

In the Claims:

At column 8, claim number 8, line number 20, change "a the" to --a--.

Signed and Sealed this
Nineteenth Day of February, 2013

Teresa Stanek Rea
*Acting Director of the United States Patent and Trademark Office*